United States Patent Office 3,385,883
Patented May 28, 1968

3,385,883
A-NOR-D-HOMOSTEROIDS
Seymour D. Levine, North Brunswick, N.J., assignor to E. R. Squibb & Sons, Inc., New York, N.Y., a corporation of Delaware
No Drawing. Filed Mar. 17, 1966, Ser. No. 534,996
4 Claims. (Cl. 260—488)

This invention relates to and has as its object the provision of new physiologically active steroids, processes for their production and novel intermediates useful in the preparation thereof.

More particularly, this invention relates to A-nor-D-homo-17-methyl steroids having the formula

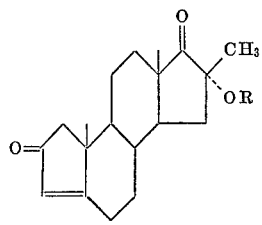

wherein R is selected from the group consisting of hydrogen and acyl.

The preferred acyl and acyloxy radicals are those of hydrocarbon carboxylic acids of less than twelve carbon atoms, as exemplified by the lower alkanoic acid (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The novel compounds of this invention are pharmacologically active substances which possess anti-androgenic activity (i.e., they inhibit the actions of androgens), and which may be used in the treatment of such conditions as hyperandrogenic acne.

The compounds may be formulated for such administration, the concentration and/or dosage being based on the activity of the particular compound and the requirements of the patient.

The compounds of this invention may be prepared according to the processes of this invention beginning with 17α-hydroxy-A-norprogesterone. This starting material may be prepared by the process disclosed in copending U.S. patent application, Ser. No. 399,838, filed Sept. 28, 1964.

The starting material may be treated with boron fluoride etherate in the presence of an acid anhydride to yield the 17β-methyl-Δ³-A-nor-D-homoandrostane-2,17a-dione-17α-ol acyl compounds of this invention. Deacylation of this compound may be accomplished by treating it with a potassium carbonate in alcohol (e.g., methanol) solution. From this reaction 17β-methyl-Δ³-A-nor-D-homoandrostene-2,17a-dione-17α-ol is recovered. This latter compound may be treated with thionyl chloride to yield the Δ¹⁶-compound of this invention.

The following examples illustrate this invention; all temperatures are in degrees centigrade unless otherwise specified.

Example 1.—17β-methyl-Δ³-A-nor-D-homoandrostene-2,17a-dione-17α-ol acetate

A solution of 824 mg. of 17α-hydroxy-A-norprogesterone in 80 mml. of glacial acetic acid is treated with 3.2 ml. of acetic anhydride and 3.2 ml. of boron fluoride etherate and left at room temperature for sixteen hours. The reaction mixture is treated with 80 ml. water and concentrated to a small volume, diluted with water and extracted with ether. The ether extracts are washed with sodium bicarbonate solution, 8% salt solution, dried (sodium sulfate) and evaporated to dryness. The residue is crystallized from ether-hexane to give 505 mg. of crystalline material which is plate chromatographed on neutral alumina (Activity V) as the adsorbent and developed with chloroform. Elution of the major ultraviolet absorbing band with ethyl acetate gives a residue which is crystallized from chloroform-isopropyl ether to afford 285 mg. of 17β-methyl-Δ³-A-nor-D-homoandrostene-2,17a-dione-17α-ol acetate, M.P. 150–151°. The analytical sample is prepared by recrystallization from chloroform-isopropyl ether, M.P. 150–151°, $\lambda_{max.}^{KBr}$ 5.80 (sh.), 5.87, 5.96. and 6.17μ; $\lambda_{max.}^{EtOH}$ 233 mμ (15,200); $\tau_{CDCl_3}^{TMS}$ 8.92 (s., 18-Me), 8.84 (s., 19-Me) 8.54 (s., 17β-Me), 7.99 (s, 17α-acetate) and 4.28 (s., 3-H).

Analysis.—Calc'd for $C_{22}H_{30}O_4$ (358.46): C, 73.71; H, 8.44. Found: C, 73.85; H, 8.45.

Example 2.—17β-methyl-Δ³-A-nor-D-homoandrostene-2,17a-dione-17a-ol

A mixture of 185 mg. of 17β-methyl-Δ³-A-nor-D-homoandrostene-2,17a-dione-17α-ol acetate and 1.5 ml. of 10% potassium carbonate solution in 15 ml. of methanol is left at room temperature for seventeen hours. The reaction mixture is diluted with water and extracted with chloroform. The chloroform extracts are washed with 8% salt solution, dried (sodium sulfate) and evaporated to dryness to give 117 mg. of 17β-methyl-Δ³-A-nor-D-homoandrostene-2,17a-dione-17α-ol, M.P. 163–164°. The analytical sample is prepared by recrystallization from chloroformisopropyl ether, M.P. 170.5 171.5°; $\lambda^{KBr}$ 2.85, 5.95 and 6.15μ;

$\lambda_{max.}^{EtOH}$ 233 mμ (16,800); $\tau_{CDCl_3}^{TMS}$ 8.82 (s., 18-Me), 8.82 (s., 19-Me), 8.58 (s., 17β-Me), 6.03 (17α-OH) and 4.28 (s., 3-H).

Analysis.—Calc'd for $C_{20}H_{28}O_3$ (316.42): C, 75.91; H. 8.92. Found: C, 76.23; H, 9.01.

Example 3.—17-methyl-Δ³,¹⁶-A-nor-D-homoandrostadiene-2,17a-dione

A solution of 30 mg. of 17β-methyl-Δ³-A-nor-D-homoandrostane-2,17a-dione-17α-ol in 3 ml. of pyridine at −20° is treated with a solution of 0.04 ml. of thionyl chloride in 0.4 ml. of pyridine. After 0.5 hours at ice-bath temperature, the reaction mixture is diluted with water and extracted with chloroform. The chloroform extracts are washed with 2 N hydrochloric acid, 8% salt solution, dried (sodium sulfate) and evaporated to dryness. Plate chromatography of the residue using neutral alumina (Activity V) as the adsorbent and chloroform as the developing solvent gives a major ultraviolet absorbing band. Elution with ethyl acetate gives a residue which is crystallized from chloroform-isopropyl ether to give 6 mg. of 17-methyl-Δ³,¹⁶-A-nor-D-homoandrostadiene-2,17a-dione, M.P. 176–177°, λ234 mμ (25,800).

Analysis.—Calc'd for $C_{20}H_{26}O_2$ (298,41): C, 80.49; H, 8.78. Found: C, 80.20; H, 9.18.

The invention may be variously otherwise embodied within the scope of the appended claims.

What is claimed is:
1. A steroid having the formula

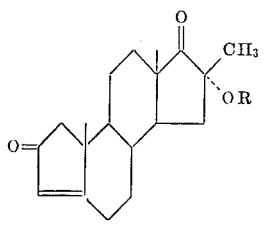

wherein R is selected from the group consisting of hydrogen and acyl derived from hydrocarbon carboxylic acids having less than twelve carbon atoms.

2. A compound in accordance with claim 1 having the name 17β - methyl - $\Delta^3$ - A-nor-D-homoandrostene-2,17a-dione-17α-ol acetate.

3. A compound in accordance with claim 1 having the name 17β - methyl - $\Delta^3$ - A-nor-D-homoandrostene-2,17a-dione-17α-ol.

4. A compound having the name 17-methyl-$\Delta^{3,16}$-A-nor-D-homoandrostadiene-2,17a-dione.

References Cited
UNITED STATES PATENTS

| | | | |
|---|---|---|---|
| 3,024,271 | 3/1962 | Amiard et al. | 260—476 |
| 3,194,832 | 7/1965 | Reimann et al. | 260—488 |

LORRAINE A. WEINBERGER, *Primary Examiner.*

VIVIAN GARNER, *Assisitant Examiner.*